United States Patent [19]
Grier et al.

[11] Patent Number: 5,491,174
[45] Date of Patent: Feb. 13, 1996

[54] PROCESS FOR PREPARATION OF POLYURETHANES UTILIZING NOVEL CATALYSTS

[75] Inventors: Laura A. Grier, Brazoria; Paul L. Neill; Ralph D. Priester, both of Lake Jackson, all of Tex.; Larry W. Mobley, Cohutta, Ga.; Kenneth W. Skaggs; Robert B. Turner, both of Lake Jackson, Tex.

[73] Assignee: The Dow Chemical Company, Midland, Mich.

[21] Appl. No.: 418,918

[22] Filed: Apr. 7, 1995

Related U.S. Application Data

[63] Continuation of Ser. No. 959,306, Oct. 9, 1992, abandoned.

[51] Int. Cl.$^6$ .............................. C08G 18/24; C08J 9/04; B05D 7/26
[52] U.S. Cl. .................. 521/126; 427/385.5; 427/389.9; 521/127; 521/128; 521/129; 521/155; 521/163; 521/170; 521/172; 521/174; 521/901; 521/902; 528/52; 528/53; 528/54; 528/58; 528/68; 528/76; 528/80; 528/83; 528/85
[58] Field of Search ...................................... 521/126, 127, 521/128, 129, 155, 163, 170, 172, 174, 901, 902; 528/52, 53, 54, 58, 68, 76, 80, 83, 85; 427/385.5, 389.9

[56] References Cited

U.S. PATENT DOCUMENTS

| | | | |
|---|---|---|---|
| 3,661,885 | 5/1972 | Haddick et al. | 528/53 |
| 4,006,124 | 2/1977 | Welte et al. | 528/52 |
| 4,085,072 | 4/1978 | Russo | 521/108 |
| 4,115,320 | 9/1978 | Meyborg | 528/52 |
| 4,150,212 | 4/1979 | Meyborg | 528/52 |
| 4,379,105 | 4/1983 | Taylor | 264/45.5 |
| 4,732,945 | 3/1988 | Dammann | 525/384 |
| 4,788,083 | 11/1988 | Dammann et al. | 528/58 |
| 4,826,617 | 5/1989 | Dammann | 524/350 |
| 5,049,313 | 9/1991 | Frentzel | 523/459 |
| 5,104,693 | 4/1992 | Jenkines | 427/358 |
| 5,166,301 | 11/1992 | Jacobs | 528/77 |
| 5,200,264 | 4/1993 | Frentzel | 428/402 |
| 5,243,012 | 9/1993 | Wicks et al. | 528/58 |
| 5,419,929 | 5/1995 | Ishidoya et al. | 427/386 |

FOREIGN PATENT DOCUMENTS 379246  7/1990  European Pat. Off. .

OTHER PUBLICATIONS

Chemical Abstract 95(24):205043z.
Chemical Abstract 78(12):73186k.
Chemical Abstract 101(2):8529d.
Chemical Abstract 89(26):216957c.
Chemical Abstract 82(16):99712m.
Chemical Abstract 89(4):25834a.
Chemical Abstract 100(6):35616r.
Chemical Abstract 96(10):74353w.
Chemical Abstract 84(20):136534u.
Derwent Abstract 0718127.
Derwent Abstract 0931613.
Derwent Abstract 0844573.
Derwent Abstract 0952812.
Derwent Abstract 1096339.
Derwent Abstract 1131559.
Derwent Abstract 1132507.
Derwent Abstract 0459912.
Derwent Abstract 0112244.
Derwent Abstract 0449796.
Derwent Abstract 0504863.
Derwent Abstract 1308367.
Derwent Abstract 1990805.
Derwent Abstract 1995426.
Derwent Abstract 2083962.

*Primary Examiner*—James J. Seidleck
*Assistant Examiner*—Rabon Sergent

[57] ABSTRACT

Novel catalyst compositions comprising complexes of tin(IV) salts and amine compounds are used to prepare polyurethanes, polyureas, polycarbodiimides and polyisocyanurates. The complexes, which preferably employ primary amines, allow delay of gelation until they dissociate under certain reaction conditions. The complexes can be prepared neat or in situ in an active hydrogen containing formulation component. The complexes serve to delay gelation of the formulation because they can be prepared to be relatively stable to moisture and will predictably dissociate upon heating, either as a result of the exothermic nature of the reaction being catalyzed or with application of an external heat source. The catalyst compositions are particularly useful for preparation of carpet underlay and in other applications requiring significant delay prior to gelation.

7 Claims, No Drawings

PROCESS FOR PREPARATION OF POLYURETHANES UTILIZING NOVEL CATALYSTS

CROSS-REFERENCE TO RELATED APPLICATION

This is a continuation of application Ser. No. 07/959,306, filed Oct. 9, 1992, now abandoned.

BACKGROUND OF THE INVENTION

This invention relates to polyurethanes and, more particularly, to preparation of polyurethanes using new catalysts.

Polyurethanes are made by a wide variety of processes differing in detail. However, the basic urethane-forming reaction is the result of contact between an active-hydrogen containing compound, frequently a polyol, i.e., a dihydroxy or polyhydroxy compound, and a diisocyanate or polyisocyanate. The reaction of these starting materials normally requires the presence of a catalyst. A number of catalysts for this purpose are known. Among those most frequently used are tertiary amines, such as, for example, triethylene diamine and N-substitute morpholines; tin(II) salts of organic acids, such as for example tin(II); and heavy metals, such as mercury.

In the case of the tertiary amines and tin(II) salts, the catalysts serve to immediately or almost-immediately promote the reaction between the starting materials and thus may perform satisfactorily where processing requires such rapid initiation of the reaction. For some purposes, however, it is desirable to delay the reaction and therefore lengthen the time between contact of the components and gelation, thereby achieving greater processing latitude. For these purposes it is desirable to employ alternative, so-called "delayed action" catalysts such as the heavy metals.

However, the mentioned catalysts exhibit certain disadvantages that may limit their use. The amines and tin salts may result in premature gelation where processing requires additional time following contact between the starting materials. Such may be the case in the preparation of certain polyurethanes such as foams, elastomers, coatings and adhesives, where the formulation components are mixed and then the mixture is poured into a mold or onto a substrate and then adequately dispersed before gelation desirably occurs. Catalysts containing heavy metals, such as mercury, bismuth, barium or cadmium, may present toxicity and environmental safety problems that are difficult to overcome.

One method of preventing premature gelation without relying on the heavy metals is disclosed in U.S. Pat. No. 3,661,885 to Haddick. That invention is drawn to use of a preformed complex of a tin(II) salt and an organic complexing agent. The mentioned tin salts include stannous chloride and salts of organic acids, e.g., aliphatic carboxylic acids such as stannous acetate, oxalate, or octanoate, or a mixture of branched aliphatic monocarboxylic acids containing from 9 to 11 carbon atoms. Complexing with secondary and tertiary amines is preferred. The use of the complex delays catalysis until an "induction period" has elapsed. However, the tin(II) salt/amine complexes tend to decompose in the presence of water, which results in loss of catalytic activity. Furthermore, the delay may be insufficient to allow for optimum processing and product quality. Thus, their applicability is somewhat limited.

Other means of preventing premature gelation include the use of "acid-blocked catalysts", such as N-hydroxyalkyl quaternary ammonium carboxylate and other amine compounds blocked with acids such as formic acid.

SUMMARY OF THE INVENTION

Accordingly, the present invention provides novel catalyst compositions useful for promoting urethane-forming reactions comprising complexes of a tin(IV) salt and an amine compound. More particularly, the compositions comprise complexes of a tin(IV) salt and a primary amine compound.

The invention further provides a method of preparing a polyurethane, polyurea, polyisocyanurate or polycarbodiimide polymer comprising contacting as formulation components an active hydrogen-containing compound and a diisocyanate or polyisocyanate in the presence of a catalyst which is a tin(IV) salt complexed with an amine compound, under reaction conditions sufficient to form a polyurethane, polyurea or polyisocyanurate or polycarbodiimide polymer.

Finally, the invention further provides a composition useful for preparing a polyurethane, polyurea, polyisocyanurate or polycarbodiimide comprising (1) a complex of a tin(IV) salt and an amine compound, and (2) an active-hydrogen containing compound. The active-hydrogen containing compound is preferably a copolymer polyol.

The catalysts of the present invention provide catalysis of the urethanation reaction between an active-hydrogen compound and a diisocyanate and/or polyisocyanate that is delayed because of the heat-sensitivity of such complexes. These complexes dissociate very slowly at ambient temperature in the presence of an isocyanate compound, but the rate of dissociation increases with increasing temperature. Such increased temperature is supplied by the exothermic nature of the reaction being catalyzed, by application of an external heat source, or both. Thus, the urethanation reaction proceeds at a rate close to that of the uncatalyzed reaction of the reaction components until the dissociation occurs. The catalysts may also be prepared significantly more stable in the presence of water, particularly when a primary amine is used, which allows for greater formulation variability as well as increased storage stability.

DESCRIPTION OF THE PREFERRED EMBODIMENTS

In one aspect the present invention is a novel catalyst composition which is a tin(IV) salt complexed with an amine compound. The tin(IV) salt may be any salt of tin(IV), but preferably is selected from the group consisting of thiol esters, mercaptides, maleates, laurates and acetates of tin(IV), and mixtures thereof. These include, for example, dibutyl tin(IV) dimaleate, dibutyl tin(IV) dilaurate, dibutyl tin(IV) dimercaptide, dibutyl tin(IV) diacetate, dibutyl tin(IV) dithioglycolate, dimethyl tin(IV) dimaleate, dioctyl tin(IV) dilaurate, dimethyl tin(IV) dimercaptide, dimethyl tin(IV) dithiocarboxylate, dimethyl tin(IV) dilaurate, dioctyl tin(IV) diisooctylmercaptoacetate, dioctyl tin(IV) dimercaptide, dioctyl tin(IV) dilaurate and mixtures thereof. Preferred herein are the mercaptide and thiol ester salts, which may show increased latency, i.e., increased stability of the complex, when compared with the acetate, laurate and carboxylate salts; however, these salts, mixtures thereof, and salts employing other anions are also within the scope of the present invention. Those skilled in the art will know to take into account the generally desired reaction profile relative to the processing being employed, when selecting the salt, to optimize the benefit obtained therefrom.

The selected tin(IV) salt is complexed with an amine compound to form the catalysts of the present invention. The amine compound may be a primary, secondary or tertiary amine compound. Primary amine compounds are particularly preferred for reactions wherein blowing is undesirable; secondary and tertiary amines tend to promote such a co-blowing reaction and thus are preferred where promotion of more blowing during the polyurethane reaction is desired. Furthermore, the primary amine compounds may in some cases form more stable complexes, particularly in the presence of water, thus offering the advantage of increased control over the latency of the reaction. Useful amine compounds include, for example, $C_1$–$C_5$ mono- and diamines, aromatic amines, and mixtures thereof, with the $C_1$–$C_5$ diamines being preferred. While the amine compounds useful in the present invention may have molecular weights from about 50 to about 10,000, in general the lower molecular weight amines are preferred, i.e., amine compounds having a molecular weight of less than about 1500 g/mol. More preferred are amine compounds having a molecular weight of less than about 1000 g/mol. Examples of particularly useful amine compounds include butylamine, dibutylamine, dipropylamine, ethylenediamine, triethylenediamine and mixtures thereof.

Preparation of the complexed catalyst compositions can be accomplished using methods known to those skilled in the art. The selection of preparation method depends in part on the character of the selected starting materials. For example, one method that is effective when both the tin(IV) salt and the amine compound starting materials are liquids at processing temperature involves mixing the tin(IV) salt and the complexing amine compound, neat, in the appropriate proportions. In another method the salt and the amine compound are combined in solution, using an organic solvent such as, for example, acetone, toluene or isooctane. Such solvent is preferably essentially non-nucleophilic and non-polar, since use of a nucleophilic or polar solvent may increase the occurrence of side reactions which can interfere with complex formation.

A preferred method of preparing the complex is in situ preparation in a polyol or other active hydrogen compound which will be used as a reactant in the basic polyurethane, polyurea, polyisocyanurate or polycarbodiimide reaction. The tin(IV) salt and the amine compound are added to the polyol, preferably in a salt:amine ratio of from about 1:1 to about 1:3, more preferably about 1:1, and mixing is performed to ensure optimal complex formation. Formation of the complex is concentration-dependent, and thus it is desirable to achieve complexation of most or all of the starting materials to prevent premature catalytic activity of any uncomplexed starting material, and particularly of the tin(IV) salt. Where an excess of the amine compound is employed it is then desirable to remove the uncomplexed excess, using methods known to those skilled in the art. Such methods may include, for example, vacuum stripping. This preferred method can be carried out in a conventional polyol, as described hereinbelow, or, in a particularly preferred embodiment, in a copolymer polyol.

Confirmation that the complexed catalyst compositions of the present invention have, indeed, been formed can be obtained using a variety of methods generally known to those skilled in the art. For example, any test which determines the latency of catalytic activity as a function of increasing viscosity can be carried out. In general such test compares the reaction profile of a formulation containing a given tin(IV) salt with a formulation containing the catalyst of the present invention comprising the same tin(IV) salt. This comparison allows those skilled in the art to select one of the catalysts of this invention for use according to its ability to obtain a desired reaction profile.

An alternative means of confirming catalyst formation, known to those skilled in the art, is the use of differential scanning calorimetry (DSC), which verifies the integrity of the crystalline complex. Nitrogen-15 nuclear magnetic resonance spectroscopy ($N^{15}$-NMR) can also be used to verify the formation of the crystalline complex.

Once formed, whether neat or in situ, the complexed catalyst composition is then ready for use in a urethane-forming reaction between an active-hydrogen compound and a diisocyanate and/or polyisocyanate compound in a polyurethane, polyurea or polyisocyanurate formulation. The catalyst may advantageously be incorporated in the formulation in various ways, for example (1) using the catalyst as a component of a composition which also comprises the active hydrogen compound, or a portion thereof; or (2) using the catalyst neat as a separate stream introduced concurrently with initial contact of the other formulation components.

In one particularly preferred embodiment the catalyst compositions of the present invention may be combined, by any effective means, with an active hydrogen compound comprising a copolymer polyol. These are base polyols containing stably dispersed polymers such as styrene acrylonitrile copolymers. Production of these copolymer polyols may be from reaction mixtures comprising a variety of other materials, including, for example, catalysts such as azobisisobutyronitrile; copolymer polyol stabilizers; or chain transfer agents such as isopropanol. The dispersed particles of polymer present in a copolymer polyol have a tendency to maintain distribution of the catalyst therein, thus improving both storage stability and homogeneity of action of the catalyst in the final product. Examples of such copolymer (also called polymer) polyols include, for example, styrene acrylonitrile-containing polyols. Preferably such copolymer polyols contain a dispersion of solids which are up to about 90 percent styrene, preferably from 50 to about 80 percent styrene, and most preferably about 70 percent styrene, the remainder being acrylonitrile; copolymer polyols containing 100 percent acrylonitrile; polyharnstoff dispersion (PHD) polyols; and polyisocyanate polyaddition (PIPA) polyols. Further description of some of these polyols including description of preparation methods may be found in, for example, U.S. Pat. Nos. 4,374,209; 4,324,716; 4,310,448; 4,310,449; 4,305,857; and 4,305,858, which are incorporated herein by reference in their entirety.

Additional active-hydrogen compounds useful in the present invention include, for example, those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes.

Also preferred are poly(oxypropylene) glycols, triols, tetrols and hexols and any of these that are capped with ethylene oxide. These polyols also include poly(oxypropyleneoxyethylene) polyols. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine-terminated polyols, polymercaptans and other isocyanate-reactive compounds are also suitable in the present invention.

Other types of polyols useful in the process of the invention are polyurea polyols such as are disclosed in U.S. Pat. Nos. 3,325,421; 4,042,537; and 4,089,835; and polyoxamate polyols such as are disclosed in U.S. Pat. No. 4,407,983.

The polyethers preferably have from an average of about 1 to about 8, preferably from about 2 to about 4 hydroxyl groups per molecule. The polyethers preferably have molecular weights ranging from about 88 to about 50,000, preferably from about 1000 to about 15,000, and more preferably from about 1000 to about 5000 g/mol.

The polyethers may be prepared by processes known to those skilled in the art such as those processes described in *Encyclopedia of Chemical Technology*, Vol. 7, pp. 257–262, Interscience Publishers (1951); M. J. Schick, *Nonionic Surfactants*, Marcel Dekker, New York (1967); British Patent 898,306; and U.S. Pat. Nos. 1,922,459; 2,871,219; 2,891,073; and 3,058,921.

One or more catalysts can also be advantageously used in the preparation of the polyethers. Conventional catalysts include alkali or alkaline earth metals or their corresponding hydroxides and alkoxides, Lewis acids, mineral acids, and the like. One skilled in the art can readily determine suitable amounts of alkylene oxides, initiators, catalysts and adjutants as well as suitable process conditions for polymerizing the alkylene oxides. Additional sources of detail regarding polymerization of alkylene oxides include J. Furukawa and T. Saegusat "Polymerization of Aldehydes and Oxides," Interscience, New York (1963), pp. 125–208; G. Odian, "Principles of Polymerization," John Wiley & Sons, New York (2nd ed. 1970) pp. 512–521; J. McGrath, ed., "Ring-Opening Polymerization, Kinetics Mechanisms, and Synthesis," American Chemical Society, Washington, D.C. (1985) pp. 9–21, 137–147 and 204–217; and U.S. Pat. Nos. 2,716,137; 3,317,508; 3,359,217; 3,730,922; 4,118,426; 4,228,310; 4,239,907; 4,282,387; 4,326,047; 4,446,313; 4,453,022; 4,483,941 and 4,540,828, which are incorporated herein by reference in their entirety.

Preferred catalysts include basic catalysts, more preferably hydroxides and alkoxides of alkali and alkaline earth metals, particularly cesium, sodium, barium, potassium and lithium. Potassium and barium hydroxide is more preferred. When alkoxides are used as catalysts, the alkoxy groups advantageously contain from about one to about 36 carbon atoms. Exemplary of such alkoxides are alkoxides having anions of propylene glycol, glycerine, dipropylene glycol, propoxylated propylene or ethylene glycol and the like.

The selected active-hydrogen compound may be used alone, in mixtures thereof, or in combination with one or more copolymer polyols as described above.

Any diisocyanate or polyisocyanate compound known to be useful in the art for preparing polyurethanes, polyureas, polyisocyanurates or polycarbodiimides may be employed for the urethane-forming reaction with the active-hydrogen compound. For example, the polyisocyanate component can be advantageously selected from organic polyisocyanates, modified polyisocyanate mixtures, and isocyanate-based prepolymers. These can include aliphatic, cycloaliphatic, aromatic, and preferably multivalent isocyanates such as 1,6-hexamethylenediisocyanate; 1-isocyanato-3,5, 5-trimethyl-1-3-isocyanatomethyl-cyclohexane; 2,4-and 2,6-hexahydrotoluenediisocyanate, as well as the corresponding isomeric mixtures; 4,4'- 2,2'- and 2,4'-dicyclohexylmethanediisocyanate, as well as the corresponding isomeric mixtures; 2,4- and 2,6-toluenediisocyanate and the corresponding isomeric mixtures; 4,4'- 2,4'-and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates (crude-MDI); and mixtures of crude-MDI and toluenediisocyanates.

Also advantageously used for the isocyanate component are the so-called modified multivalent isocyanates, i.e., products which are obtained through chemical reactions of the above diisocyanates and/or polyisocyanates. Exemplary are polyisocyanates containing esters, ureas, biurets, allophanates and preferably carbodiimides; isocyanurate and/or urethane group containing diisocyanates; and/or polyisocyanates. Individual examples are aromatic polyisocyanates containing urethane groups, having NCO contents of from 2 to 50 weight percent, more preferably of from 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 3,000 g/mol. These polyols can be employed individually or in mixtures as di- and/or polyoxyalkylene glycols. For example, individual examples are diethylene glycols, dipropylene glycols, polyoxyethylene glycols, polyoxypropylene glycols and poly(oxypropyleneoxyethylene) glycols. Suitable also are prepolymers containing NCO groups, having NCO contents of from 2 to 30 weight percent, more preferably from 15 to 25 weight percent. Liquid polyisocyanates containing carbodiimide groups and/or isocyanurate rings, having NCO contents of from 8 to 35 weight percent, more preferably from 20 to 35 weight percent, can also be used. These include, for example, polyisocyanates based on 4,4'-, 2,4'- and/or 2,2'-diphenylmethanediisocyanate and the corresponding isomeric mixtures; 2,4- and/or 2,6-toluenediisocyanate and the corresponding isomeric mixtures; mixtures of diphenylmethane diisocyanates and polyphenylpolymethylenepolyisocyanates (crude MDI) and mixtures of toluenediisocyanates and crude MDI and/or diphenylmethane diisocyanates.

Also useful in the present invention are: (i) polyisocyanates containing carbodiimide groups and/or urethane groups, from 4,4'-diphenylmethane diisocyanate or a mixture of 4,4'- and 2,4'-diphenylmethane diisocyanates having an NCO content of from 8 to 35 weight percent; (ii) prepolymers containing NCO groups, having an NCO content of from 10 to 30 weight percent, based on the weight of the prepolymer, prepared by the reaction of polyoxyalkylene polyols, having a functionality of preferably from 2 to 4 and a molecular weight of from 200 to 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluenediisocyanate and the corresponding isomeric mixtures. Polymeric methylene diphenyl diisocyanate in any of its forms can also be used and is preferred. In this case it preferably has an equivalent weight between about 100 and about 300, more preferably from about 125 to about 175, and an average functionality of at least about 2. More preferred is an average functionality of from about 2.5 to about 3.5. The viscosity of the polyisocyanate component is preferably from about 25 to about 5,000 centipoise (cps), but values from about 200 to about 1,000 cps at 25° C. are preferred for ease of processing. Similar viscosities are preferred where alternative polyisocyanate components are selected.

In the present invention an active hydrogen component is reacted with the polyisocyanate to form the polyurethane or polyisocyanurate-modified polyurethane foam. This active hydrogen component can be any compound containing an active hydrogen site as determined by the Zerewitinoff Test. Particularly preferred are aromatic or aliphatic polyether and polyester polyols or blends thereof. The polyether polyols are preferably products made using glycols, sorbitols, sucrose, glycerine, toluene diamine (TDA), methylenediphenyl diamine, Mannich bases, or polyfunctional phenols as the initiators, followed by capping with propylene oxide, butylene oxide or ethylene oxide. The polyester polyols are preferably derived from phthalic anhydride, dimethyl terephthalate, poly(ethylene terephthalate), mixtures thereof and the like. It is preferred that the polyols have a molecular weight from about 200, preferably to about 20,000, more preferably to about 10,000, and an average functionality of at least about 2.0. Polyols or polyol blends having viscosities less than about 25,000 cps are preferred, and more preferred are those having viscosities less than about 10,000 cps, for ease of processing.

The formulation can optionally also comprise an active hydrogen-containing oligomer such as a polyamine. The polyamine preferably has amino groups in bonded form on either an aliphatic or aromatic radical. For example, the aliphatically bonded polyamines can be prepared by cyanoalkylation to form the nitrile, which can then be hydrogenated (seer e.g., U.S. Pat. No. 3,267,050). Another means of preparing the aliphatically-bonded polyamines is to aminate a polyoxyalkylene polyol with ammonia in the presence of hydrogen and certain catalysts, as described in, for example, German Patent Application No. 12 15 373, which is incorporated herein by reference in its entirety.

Suitable polyoxyalkylene polyamines having amino groups in bonded form on the aromatic radical can be prepared by, for example, reacting the above mentioned polyoxyalkylene polyols with aromatic polyisocyanates in a ratio of NCO:OH groups of at least about 2. The resulting prepolymers containing aromatic NCO groups can subsequently be hydrolyzed to form polyamines, as is known to those skilled in the art. The polyoxyalkylene polyamines can be employed as individual compounds or in mixtures from products having differing molecular weights and functionalities.

The present invention can also be used in conjunction with additional commonly used polyurethane, polyurea, polyisocyanurate and/or polycarbodiimide formulation components, such as, for example, surfactants, blowing agents, fillers, pigments, additional catalysts, and the like, such as are known to those skilled in the art. Exemplary surfactants include those compounds which improve the homogenization of the starting components, and which also generally regulate cell structure. Use of the surfactants tends to result in the nucleation of smaller bubbles prior to gelling, and therefore smaller cells upon cure. Smaller cells contribute to a reduction in K factor for rigid foam applications, i.e., an improvement in insulation value of the final foam, and may contribute to the integrity and desired final properties of flexible and semi-flexible foams. Typical examples of surfactants are emulsifiers, such as the sodium salts of ricinoleic sulfates or fatty acids; salts of fatty acids having amines, e.g., oleic acid diethanolamine, stearic acid diethanolamine, and ricinoleic acid diethanolamine; salts of sulfonic acid, e.g., alkali salts or ammonium salts of dodecylbenzoic acid or dinaphthylmethanedisulfonic acid and ricinoleic acid; foam stabilizers such as polysiloxanes including polydimethylsiloxane polyoxyalkylene block copolymers; mixtures thereof; and the like. The surfactants are generally used in amounts of from about 0.01 to about 5 parts by weight, based on 100 parts of polyol.

Where density reduction is desired, in one preferred embodiment of the present invention mechanical frothing is employed. In another embodiment one or more blowing agents can be used. These can be any which can be used in preparing the polyurethane or related foams of the present invention and are preferably low boiling-point liquids which vaporize under the influence of the exothermic addition polymerization reaction. Liquids which are suitable are inert to the organic polyisocyanate and preferably have boiling points from about 50° C. to about 100° C., preferably from about 20° C. to about 50° C. Examples of these liquids include, in particular, pentane, hexane, methyl formate, ethyl formate, t-butyl methyl ether, halogenated hydrocarbons such as methylene chloride, trichlorofluoromethane, dichlorodifluoromethane, dichloromonofluoromethane, dichlorotetrafluoroethane and 1,1,1-trichloro-2,2,2-trifluoroethane, 1-chloro-1,1-difluoroethane, 2,2-dichloro-1,1,1-trifluoroethane, 1-fluoro-1,1-dichloroethane, and mixtures thereof. Preferred herein are trichlorofluoromethane, 1,1,1-trichloro-2,2,2-trifluoroethane, 1-fluoro-1,1-dichloroethane, 2,2-dichloro-1,1,1-trifluoroethane, pentane, methyl formate, ethyl formate and mixtures thereof. These blowing agents can alternatively be mixed with other substituted or unsubstituted hydrocarbons.

Other means of density reduction include chemical blowing additives. Some of these additives generate carbon dioxide as a blowing agent when reacted with isocyanates such as diphenylmethane diisocyanates and derivatives thereof. Examples include water, carboxylic acids, methyl phospholene oxide, mixtures thereof and the like. Other chemical blowing additives, such as azo compounds including, for example, azobisisobutyronitrile, generate nitrogen. These chemical blowing additives can be combined with any of the above-listed low-boiling point blowing agents.

In preparing the polyurethane and related foams of the present invention the selected blowing agent is acceptably used in an amount determined by the desired density of the target product from which the scrap material will be derived. Commonly amounts of from about 1 to about 15 weight percent, more preferably from about 2 to about 11 weight percent, based on the weight of polyol can be advantageously used. It is to be understood that, if the present invention is used in conjunction with preparing polyurethanes for coating, sealant or adhesive applications, such as carpet backing, no blowing agent is generally desired. However, mechanical frothing may alternatively be employed to prepare carpet underlay or for other applications in which density reduction is desired.

Fillers which can be used in the polyurethanes of the present invention include, for example, conventionally known organic and inorganic fillers, reinforcing agents, weight increasing agents, agents to improve paint wear, coating agents, and the like. Such fillers also often serve to reduce cost. Typical inorganic fillers include silicate minerals such as antigorite serpentine; hornblend; amphibole; mica; metal oxides such as kaolin, aluminum oxide, titanium oxide, and iron oxide; metal salts such as chalk, calcium carbonate and heavy spar; inorganic pigments such as cadmium sulfide, iron oxide and zinc sulfide; carbon black; mixtures thereof; and the like. Preferably used are kaolin (China clay); aluminum silicate; coprecipitates of barium sulfate and aluminum silicate; calcium carbonate; aluminum trihydrate; natural and synthetic fibrous minerals, such as wollastonite; and glass fibers of different lengths which also may be sized. Preformed mats of glass fibers such as those used in structural reaction injection molding processes can also be used. Typical organic fillers include urea, coal, melamine, pine resin, cyclopentadienes and graft polymers based on styrene acrylonitrile, which are prepared by in situ polymerization of acrylonitrile-styrene mixtures in polyether polyols. Fillers based on polyoxyalkylene polyamines, in which the aqueous polymer dispersions are converted into polyoxyalkylene polyamine dispersions, can also be effectively used. In general, the use of fillers is desirable, particularly where a copolymer polyol is not selected, because the dispersion of filler serves to improve the dispersion of the catalyst complexes of the present invention, which in turn increases the uniformity of catalysis and resultant viscosity increase. In frothed systems, the fillers are advantageously used in amounts ranging from about 5 to about 300, preferably from about 20 to about 200, and more preferably from about 50 to about 130 parts per 100 parts of the active hydrogen component. Slightly higher loadings can be used in non-blown systems.

Those skilled in the art will know how to tailor the desired reaction profile using additional catalysts if needed, in order to obtain the desired final properties of the polyurethane, polyurea, polycarbodiimide or polyisocyanurate product being prepared. The use of such cocatalysts is well-known in the art. These cocatalysts include the spectrum of commonly used catalysts such as, for example, urethanation, trimerization, and/or water blowing type catalysts. It is necessary to include a trimerization catalyst when trimerization of the excess isocyanate groups to form isocyanurate linkages is to be performed to prepare a polyisocyanurate-modified polyurethane. Illustrative trimer catalysts may include, for example, tertiary amine compounds such as N,N-dialkylpiperazines; trialkylamines such as N,N' N"-tris(dialkylaminoalkyl) hexahydrotriazines; mono-, di-, and tri(dialkylaminoalkylmonohydric phenols or thiophenols; and alkali metal carboxylates such as potassium acetate.

Illustrative urethanation and water blowing catalysts include tertiary amines such as the trialkylamines, including trimethylamine, triethylamine, tributylamine and the like; triethylene diamine, and the lower alkyl derivatives thereof; mixtures thereof and the like.

Further information concerning the above-described conventional auxiliaries and additives can be found in numerous sources in the technical literature, for example, in the monograph by J. H. Saunders and K. C. Frisch, *High Polymers*, volume XVI, "Polyurethanes", parts 1 and 2, Interscience Publishers, 1962 and/or 1964, or in *Plastics Handbook*, "Polyurethanes", volume VII, Hanser-Verlag, Munich and Vienna, First and Second Editions, 1966 and 1983.

Procedures for preparing the polyurethane or related material using the catalyst compositions of the present invention, active-hydrogen compound, di- and/or polyisocyanate and any additional formulation components, selected according to the desired application and desired final properties of the polyurethane, are known to those skilled in the art. In general, the present invention can be used in conjunction with either the "one-shot" technique, which is generally known to involve a one-step mixing of the isocyanate and active-hydrogen components, or the "two-shot" technique, in which a prepolymer is prepared and then reacted with additional active-hydrogen component to make the final product.

A wide variety of polyurethanes, polyureas, polycarbodiimides and polyisocyanurates can be prepared using the compositions of the present invention. These can include, for example, coatings such as are used for carpet backing; sealants; adhesives; flexible foams, for applications such as carpet underlay and seating; rigid foams for insulative purposes; and semi-flexible materials for shoe soles.

One particular advantage of the present invention is its potential application in the carpet industry to prepare polyurethane backing coatings. This is because of the control allowed by the stability of the complexes at ambient temperature, ideally suiting the complexes to use in the delayed catalysis methods traditionally employed. While the basic polyurethane forming reaction is itself somewhat exothermic and the shear forces exerted within a mix-head do provide a certain amount of additional heat to the catalyst, whether the catalyst is being introduced neat or in another formulation component as a vehicle, the generated heat is generally insufficient to promote or allow rapid reaction of the urethane-forming components of the formulation containing the catalyst. Thus, the formulation components remain relatively unreactive during the operations used to distribute the polyurethane over the substrate, e.g., a textile surface, to be coated. This allows for optimal distribution and penetration while viscosity is minimal.

In general, the method used to prepare polyurethane-backed substrates such as carpets involves mixing the individual components and applying a layer of preferably uniform thickness onto one surface of the substrate. It is often preferred to pre-mix all of the components except the polyisocyanate or diisocyanate (and the blowing agent, when the system is to be frothed), to form a formulated "B-side". This simplifies the metering and mixing of the components at the time the composition is being prepared. In preparing a frothed polyurethane backing, it is preferred to mix all the components and then blend a gas into the mixture, using equipment such as an Oakes or Firestone foamer.

In general the substrate can be a wide variety of materials to which the polyurethane layer can adhere upon curing. Plastic sheeting, cloth, paper, metal foils, felts, glass fiber scrims, and woven, non-woven and tufted textiles are all suitable.

The amount of the polyurethane-forming composition used can vary widely, from about 5 to about 500 or more ounces per square yard, depending on the desired characteristics of the final substrate. In general for carpet applications, about 10 to about 200, preferably about 30 to about 120 ounces of polyurethane foam are applied per square yard. For carpet precoats, i.e., the penetrating layer which serves to hold cut carpet fibers to the textile surface, the precoat material is used in an amount of from about 3 to about 70, preferably from about 5 to about 40, ounces per square yard. Such precoats are further described in U.S. Pat. Nos. 4,296,159 and 4,696,849, incorporated herein by reference in their entirety.

Once the polyurethane-formulation has been applied to coat the carpet substrate, the substrate is typically then subjected to heating in an oven at from about 80° C. to about 135° C. This heating has traditionally served to cure the final polyurethane to provide maximum strength to the textile/precoat or backing bond. Since the complexes begin to dissociate when heated to at least about 15° C., and more generally between about 15° C. and about 40° C., this heating step results in initiation of rapid reaction and subsequent cure. Thus, the latency imparted by the use of the catalyst complexes of the present invention allows for increased ease of processing and uniformity of application without sacrifice of overall speed of processing or properties of the final product.

The following examples are given to more particularly illustrate the present invention. They are not intended to be limitative of the scope of the invention and should not be construed as being so. All parts and percentages are by weight unless otherwise indicated. For purposes of these examples the following descriptions of materials apply.

"Polyol A" is a glycol-initiated, ethylene oxide capped diol having a molecular weight of about 2,000.

"Polyol B" is a glycerine-initiated, ethylene oxide capped polyol having a molecular weight of about 5,000.

"Polyol C" is a 210 molecular weight aromatic diol.

"Polyol D" is a sucrose/glycerine co-initiated polyol having a molecular weight of about 600.

"Polyol E" is a propylene oxide based diol having a molecular weight of about 2,000.

EXAMPLE 1-Formation of a dibutyl tin(IV) dilaurate/ethylenediamine complex in solvent Dibutyl tin(IV) dilaurate (150.25 g) is added to acetone (300 g) and stirred under a nitrogen pad. Ethylenediamine (14.3 g) is added dropwise. The reaction is exothermic and is maintained below about 20° C. using external cooling fans. After completion of the addition of ethylenediamine the resulting slurry is vacuum filtered to remove the solvent and to dry the resulting complex. The complex formed is a waxy material. The complex is evaluated by differential scanning calorimetry (DSC) for verification of formation.

EXAMPLE 2- Formation of a dibutyl tin(IV) dilaurate/ethylenediamine complex in polyol.

Using the method of Example 1 but substituting a polyol for the solvent, dibutyl tin(IV) dilaurate (20 g) is added to Polyol A (196.2 g). After addition of the ethylenediamine (1.8 g), the resulting complex in the polyol is allowed to stir for 1 hour. The complex in the polyol is then vacuum stripped. The resulting complex is 10 percent by weight in the polyol.

EXAMPLE 3- Comparative Evaluation of dibutyl tin(IV) dilaurate/ethylenediamine complex in a precoat formulation A formulated "B-side" is prepared by mixing the components shown in Table 1 as a master batch.

TABLE 1

| Component | Amount |
| --- | --- |
| Polyol A | 75 |
| Polyol B | 10 |
| Polyol C | 5 |
| Polyol D | 5 |
| 1,4-butanediol | 5 |

The master batch is placed in a constant temperature bath and equilibrated to about 20° C. Concurrently, liquified methylene diphenyl diisocyanate (MDI) is placed in 4-oz. glass bottles in a constant temperature bath at about 20° C.

The complex prepared in Example 2 is then diluted with Polyol A for a molar equivalent of $1\times10^{-6}$M of complex to 1 g of solution.

About 100 g of the master batch and 40 g of the MDI is mixed for 30 seconds in a plastic cup. To this solution about 1 g of the diluted complex solution is added and the rate of gelation is measured based on viscosity increase. The complexed catalyst delays the gelation by 4.0 to 4.5 minutes longer than the dibutyl tin(IV) dilaurate alone at an equivalent tin molar ratio.

EXAMPLE 4-Formation of dibutyl tin(IV) dimaleate/ethylenediamine complex in polyol/copolymer polyol blend.

Using the method of Example 2, dibutyl tin(IV) dimaleate (204.8 g) is added to a blend of Polyol A (1296 g) and a copolymer polyol comprising 70 percent by weight styrene and 30 percent by weight acrylonitrile solids dispersed in a 500 molecular weight, ethylene oxide capped polyol (864 g). Ethylene diamine (35.2 g) is used. Following vacuum stripping to remove residual ethylenediamine, the resulting complex is 10 percent by weight in the blend.

EXAMPLE 5-Comparative evaluation in a precoat formulation of a dibutyl tin(IV) dimaleate/ethylenediamine complex in a blend of Polyol A and copolymer polyol A polyol/filler "B-side" is first prepared by adding Polyol E and, as fillers, calcium carbonate and aluminum trihydrate to a beaker in the proportions shown in Table 2.

TABLE 2

| Component | Control* | Sample A | Sample B | Sample C |
| --- | --- | --- | --- | --- |
| Polyol E | 85 | 85 | 85 | 85 |
| Dipropylene Glycol | 15 | 15 | 15 | 15 |
| CaCO$_3$ | 70 | 70 | 70 | 70 |
| Al$_2$O$_3$3H$_2$O | 135 | 135 | 135 | 135 |
| MDI | 54 | 54 | 54 | 54 |
| Dibutyl tin(IV) dithioglycolate | 0.018 | — | — | — |
| TOPCAT[1] 290 | 0.060 | — | — | — |
| Dibutyl tin(IV) dimaleate/EDA complex | — | 0.10 | 0.15 | 0.20 |

*Not an example of the present invention
[1]TOPCAT 290 is an organotin catalyst available from Tylo Industries.

These components are mixed with a high shear mixer until the fillers are thoroughly wetted with the polyol. The temperature of the B-side blend is controlled at about 10° C. The methylene diphenyl diisocyanate (MDI) is then added at an isocyanate index of 110 to the B-side blend and mixed until a temperature of about 12° C. is reached.

A catalyst is then prepared and added to the reaction mixture according to the formulations of Table 2 via syringe and the contents of the beaker are agitated for an additional 30 seconds. Immediately. after mixing, the reaction mixture is doctored onto the back of a 30-ounces/square yard nylon loop carpet. The coated carpet sample is placed in an oven at 115° C. and cured for 8 minutes. After allowing the carpet samples to age at least 7 days, physical properties are measured. The properties for each sample are shown in Table 3.

TABLE 3

| Property | Control* | Sample A | Sample B | Sample C |
| --- | --- | --- | --- | --- |
| Coating weight (oz/yd$^2$) | 30 | 31 | 31 | 31 |
| Tuft Lock (lb) | 23 | 28 | 27 | 28 |
| Edge Curl (cm) | 0.8 | 2.0 | 2.0 | 2.0 |
| Edge Ravel (lb) | 1.9 | 2.5 | 2.4 | 2.4 |
| Tack free time[1] (min:sec) | 3:30 | 5:00 | 4:15 | 3:30 |

TABLE 3-continued

| Property | Control* | Sample A | Sample B | Sample C |
| --- | --- | --- | --- | --- |

*Not an example of the present invention.
[1]Determined at 115° C.

EXAMPLE 6-Comparative evaluation of dibutyl tin(IV) dilaurate/butylamine complex in polyol for moisture sensitivity Dibutyl tin(IV) dilaurate (10 g) is added to Polyol A (196.2 g) and stirred under a nitrogen pad. Butylamine (4.6 g) is added dropwise. The reaction is carried out according to Example 2. Following vacuum stripping the resulting complexed catalyst is 10 percent by weight in the polyol.

The complexed catalyst mixture is then evaluated for moisture sensitivity by measuring volume expansion. Using the method of Example 3, the mixture is further diluted using the same polyol level of $1\times10^{-6}$M of complex to 1 g of solution. Following preparation of the reaction mixture according to Example 3, the volume increase is measured and taken as the difference between the volume of the reaction mixture initially and the volume after one hour. The volume increase after one hour is 23 percent.

As a comparative, COCURE* 30 (*COCURE 30 is an organomercurial carboxylate catalyst, available from Cosan Chemical Company) is added to Polyol A and stirred under a nitrogen pad. Additional processing is carried out according to Example 2. Using the same method the volume increase is measured and found to be 15 percent.

EXAMPLE 7-Comparative evaluation of dibutyl tin(IV) dilaurate/triethylenediamine complex in polyol for moisture sensitivity Using the method of Example 6, dibutyl tin(IV) dilaurate (10 g) is added to Polyol A (196.2 g). About 3.5 g of triethylenediamine is added dropwise. After vacuum stripping the complex is present in Polyol A at a level of 10 percent by weight. Evaluation as described in Example 6 shows that the complex has a volume increase of 43 percent, i.e., 27 percent more than the formulation containing COCURE* 30.

EXAMPLE 8-Comparative evaluation of dibutyl tin(IV) dimercaptide/ethylenediamine complex in polyol Dibutyl tin(IV) dimercaptide (20 g) is added to Polyol A (198.0 g) and processing is continued according to Example 3, using 2.0 g of ethylenediamine. After vacuum stripping the complex (10 percent by weight in the polyol) is evaluated for rate of gelation as described in that example. The formulation containing the complexed catalyst has a delay in gelation of 1.0 to 1.75 minutes longer than the formulation containing the same tin catalyst in uncomplexed form at an equivalent tin molar ratio.

EXAMPLE 9-Comparative formation of tin(II) octoate/ethylenediamine complex in a solvent and evaluation as to moisture sensitivity Tin(II) octoate (150.0 g) is added to isooctane (200 g) and processed according to Example 1 using 22.2 g of ethylenediamine. The resulting slurry is vacuum filtered to remove the solvent and to dry the resulting complex to a powder. The powder is moisture-sensitive and begins to darken upon completion of the drying process, and within a week appears fused into a solid mass.

EXAMPLE 10-Comparative evaluation of viscosity build in carpet formulations with and without dibutyl tin(IV) dimaleate/EDA complex Two carpet formulations are prepared using the components shown in Table 4.

TABLE 4

| Component | Comparative Sample | Sample D |
| --- | --- | --- |
| Polyol B | 90 | 90 |
| Diethylene Glycol | 10 | 10 |
| $CaCO_3$ | 60 | 60 |
| $Al_2O_3.3H_2O$ | 50 | 50 |
| Catalyst A[1] | 0.015 | — |
| Catalyst B[2] | — | 0.015 |
| Silicone Surfactant | 0.375 | 0.375 |
| Isocyanate | 41.4 | 41.4 |

[1]Dioctyl tin(IV)(isooctyl mercaptoacetate)
[2]Dibutyl tin(IV) dimaleate/EDA complex All of the components except for the isocyanate and the catalyst are weighed into a beaker and blended together. Temperature is controlled at 8° C. The isocyanate is a blend of a polyphenyl methanediisocyanate and a soft segment prepolymer, and has an NCO content of about 23 percent. It is further described in U.S. Pat. No. 5,104,693, which is incorporated herein by reference in its entirety, and is more particularly described in Example 1 of that patent. The isocyanate is added to the beaker and mixed for one minute. The isocyanate index is 108 for each formulation. The catalyst is added and the mixture stirred for 30 seconds. The time required for the viscosity to build to 20,000 centipoise (cps) is then measured using a Brookfield model RVT viscometer using a #5 spindle at 20 rpm. The Comparative Sample has a time of 5:00 seconds. Sample D exhibits a time of 6:00 seconds.

What is claimed is:

1. A method of preparing a polyurethane, polyurea, polycarbodiimide or polyisocyanurate polymer from a formulation including a delayed action catalyst comprising contacting as formulation components an active hydrogen-containing compound and a diisocyanate or polyisocyanate in the presence of a delayed action catalyst which is a tin(IV) salt complexed with a primary or secondary amine compound, under reaction conditions sufficient to form a polyurethane, polyurea, polycarbodiimide, or polyisocyanurate polymer.

2. The method of claim 1 wherein the polyisocyanate or diisocyanate is selected from the group consisting of aliphatic, cycloaliphatic and aromatic polyisocyanates and diisocyanates.

3. The method of claim 1 wherein the tin(IV) salt is complexed with the amine compound in situ in the active hydrogen compound.

4. The method of claim 1 wherein the reaction conditions include heating to at least about 15° C.

5. The method of claim 1 further comprising applying the formulation components as a coating on a substrate.

6. The method of claim 5 wherein the substrate is a woven, non-woven or tufted textile.

7. The method of claim 1 wherein the reaction conditions include mechanical frothing.

* * * * *